(12) United States Patent
Weerts et al.

(10) Patent No.: US 9,950,581 B2
(45) Date of Patent: Apr. 24, 2018

(54) ANTI-SKID CHAIN HAVING LATERALLY STABLE GUIDING CHAINS

(71) Applicant: ERLAU AG, Aalen (DE)

(72) Inventors: Mathis Weerts, Aalen (DE); Johannes Rieger, Oberkochen (DE)

(73) Assignee: Erlau AG, Aalen (DE)

( * ) Notice: Subject to any disclaimer, the term of this patent is extended or adjusted under 35 U.S.C. 154(b) by 428 days.

(21) Appl. No.: 14/385,764

(22) PCT Filed: Feb. 1, 2013

(86) PCT No.: PCT/EP2013/051984
§ 371 (c)(1),
(2) Date: Jan. 27, 2015

(87) PCT Pub. No.: WO2013/135427
PCT Pub. Date: Sep. 19, 2013

(65) Prior Publication Data
US 2015/0129099 A1    May 14, 2015

(30) Foreign Application Priority Data
Mar. 16, 2012  (DE) .................. 10 2012 102 231

(51) Int. Cl.
*B60C 27/06* (2006.01)
*B62D 55/20* (2006.01)
(Continued)

(52) U.S. Cl.
CPC ............... *B60C 27/06* (2013.01); *B62D 55/04* (2013.01); *B62D 55/20* (2013.01); *B62D 55/205* (2013.01)

(58) Field of Classification Search
CPC ...... B60C 27/06; B62D 55/205; B62D 55/04; B62D 55/20
(Continued)

(56) References Cited

U.S. PATENT DOCUMENTS 1,336,363 A   4/1920   McLaughlin
2,973,995 A   3/1961   Weier
(Continued)

FOREIGN PATENT DOCUMENTS

CA   2152040 A1   12/1996
DE   543317       2/1932
(Continued)

OTHER PUBLICATIONS

German Search Report dated Mar. 16, 2012 for Application No. 10 2012 102 231.3, 5 pages.
(Continued)

*Primary Examiner* — S. Joseph Morano
*Assistant Examiner* — Jean Charleston
(74) *Attorney, Agent, or Firm* — Dorsey & Whitney LLP

(57) ABSTRACT

The invention relates to an anti-skid chain, in particular for forestry and agricultural vehicles. The anti-skid chain is to permit high traction, while it has a low weight and can be easily mounted. It should simultaneously be permitted for driving on roads. To enable this, an anti-skid chain to be attached to two wheels with tires disposed one behind the other at fixed distances, in particular for the two wheels of a tandem axle, is provided according to the invention. The anti-skid chain comprises two lateral, laterally stable guide chains which are located, in the mounted state, laterally of the tread of the tires. Between the two guide chains, a chain mesh with chain strands extends. Preferably, the chain mesh is subdivided into ladder sections which are only connected to each other via the guide chain. Joint points of the guide chains are located in a radial position between the radius of the tire shoulder and the tire center. The guide chains are in particular embodied as plate link chains.

20 Claims, 5 Drawing Sheets

(51) Int. Cl.
*B62D 55/04* (2006.01)
*B62D 55/205* (2006.01)

(58) Field of Classification Search
USPC ............ 152/185, 217, 213 R, 219, 231, 233
See application file for complete search history.

(56) References Cited

U.S. PATENT DOCUMENTS

| | | | | |
|---|---|---|---|---|
| 3,974,871 | A * | 8/1976 | Muller | .................... B60C 27/22 |
| | | | | 152/219 |
| 3,983,917 | A * | 10/1976 | Rieger | .................... B60C 27/08 |
| | | | | 152/233 |
| 4,135,564 | A * | 1/1979 | Muller | .................... B60C 27/08 |
| | | | | 152/182 |
| 4,304,313 | A * | 12/1981 | van der Lely | ......... B62D 11/18 |
| | | | | 180/15 |
| 5,012,848 | A * | 5/1991 | Metraux | ............... B60C 27/063 |
| | | | | 152/218 |
| 5,058,644 | A * | 10/1991 | Muller | .................... B60C 27/06 |
| | | | | 152/231 |
| 5,082,039 | A * | 1/1992 | Franklin | ................. B60C 27/12 |
| | | | | 152/219 |
| 5,951,124 | A | 9/1999 | Hoffart | |
| 6,446,690 | B1 * | 9/2002 | Deger | ................... B60C 27/006 |
| | | | | 152/217 |

FOREIGN PATENT DOCUMENTS

| | | |
|---|---|---|
| DE | 3318551 A1 | 8/1984 |
| DE | 3512617 A1 | 10/1986 |
| SU | 7868 A | 2/1929 |
| SU | 1494858 A3 | 7/1987 |
| WO | 2004035332 A1 | 4/2004 |
| WO | 2011142701 A1 | 11/2011 |

OTHER PUBLICATIONS

German Written Opinion dated Sep. 16, 2014 for Application PCT/EP2013/051984, 7 pages.

* cited by examiner

ANTI-SKID CHAIN HAVING LATERALLY STABLE GUIDING CHAINS

CROSS-REFERENCE TO RELATED APPLICATIONS

The present application is a Section 371 National Stage Application of International Application No. PCT/EP2013/051984, filed on Feb. 1, 2013, which is incorporated by reference in its entirety.

FIELD OF THE DISCLOSURE

The invention relates to an anti-skid chain for at least one tire.

BACKGROUND OF THE DISCLOSURE

To provide sufficient traction for the tires, in particular tires of tandem axles, on slippery ground such as mud and snow, plate bands as they are manufactured, for example, by the company Olofsfors are usually used. WO-A-2011142701 and WO-A-9937525 show such plate bands. Plate bands, however, are heavy and do not always provide sufficient traction.

As an alternative solution to plate bands, simple anti-skid chains are known, for example from DE-U-89433881. However, since tandem axles may only be equipped with chains at one pair of wheels, the traction gain of simple anti-skid chains is restricted. Compared to plate bands, however, anti-skid chains are much lighter and can be mounted more easily.

SUMMARY

In view of the above-described well-known solutions, the object underlying the invention is to create, in particular for tandem axles, a light-weight anti-skid device with high traction which is easily mounted and has a low weight.

This object is achieved according to the invention by an anti-skid chain to be attached to at least one tire, the anti-skid chain comprising two lateral, laterally stable guide chains which are arranged, in a mounted state, laterally of the treads of the tires, and a limp chain mesh extending between the two guide chains.

According to the invention, the guide chains are laterally stable and therefore not limp in the lateral direction, so that the anti-skid chain keeps the track well and the tires cannot run out of the guide chain. The guide chains next to the treads center the anti-skid chain on the at least one tire. Simultaneously, the position of the guide chains laterally of the treads ensures that there are at most small differences in the circumferential speed between the guide chains and the chain mesh, so that a stable circulation of the anti-skid chain is achieved with only low forces in the chain mesh.

Traction is not mainly generated by the guide chains but by the chain mesh disposed between the two guide chains thus resting on the tread of the tires. The solution according to the invention results in an anti-skid device with high traction which is easily mounted and has a low weight. Due to the chain mesh, the anti-skid chains according to the invention do not damage the road, as compared to plate bands.

Below, further embodiments of the invention will be described which are each separately advantageous. The individual embodiments can be combined with each other as desired.

DETAILED DESCRIPTION OF THE DISCLOSURE

Figure 1:
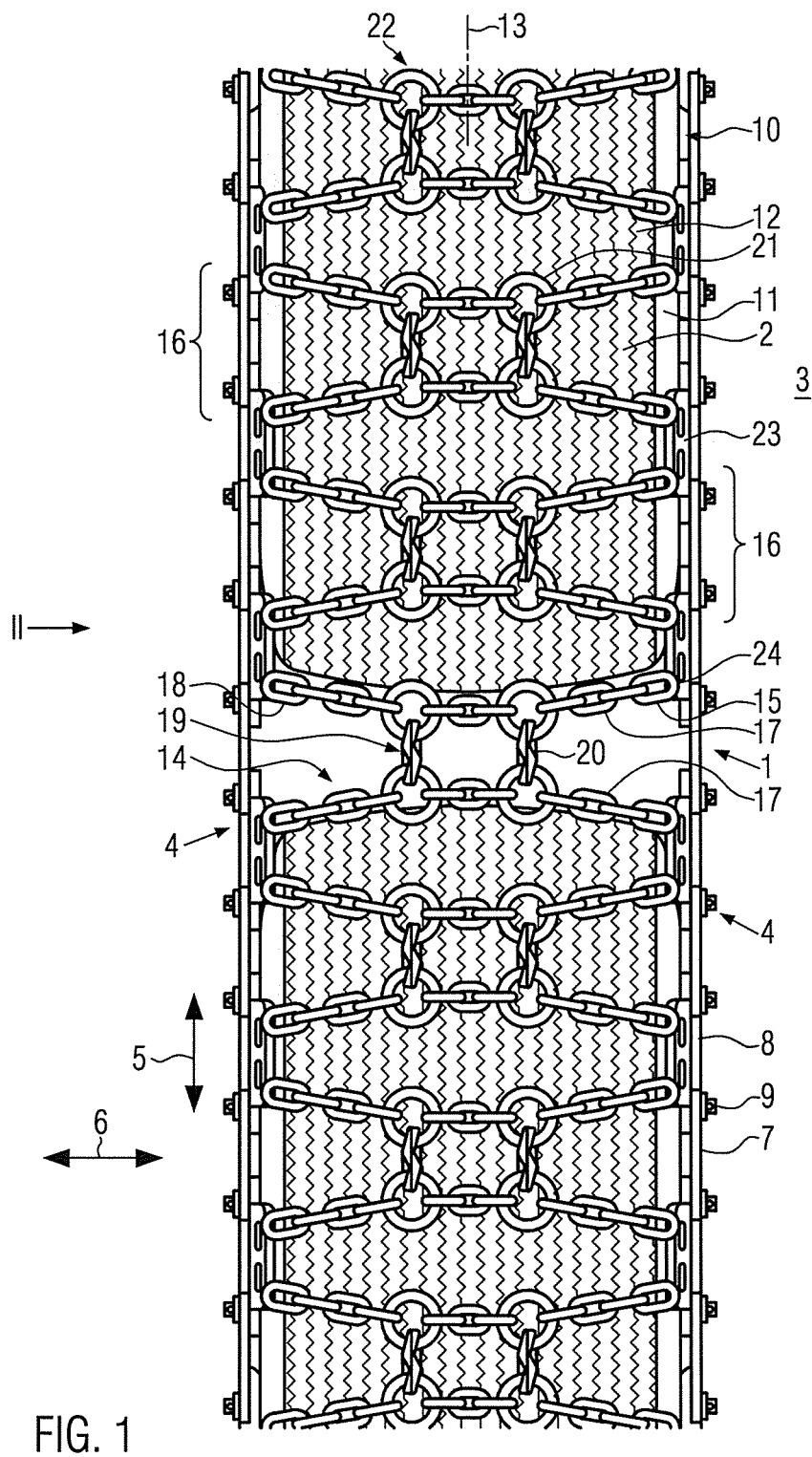
FIG. 1 shows a schematic plan view of details of an anti-skid chain according to the invention in a mounted state.

The tires employed in forestry and agriculture often have large cleats. Below, the profiled region of the side wall of such tires is referred to as tire wall. The tire shoulder is located at the lateral end of the tread. It may be spaced apart from the axially internal end of the tire wall if the tread pattern occupies a portion of the side wall of the tire due to its pattern depth.

Insofar as reference is made to dimensions of the tire, a tire filled with the respective working pressure prescribed by the factory in a new state or in a proper state of wear is assumed. The tires employed in forestry and agriculture have standardized sizes. The anti-skid chains according to the invention are each adapted to a certain size of tires.

According to a first embodiment, it is advantageous if, during the operation of the anti-skid chain, only the chain mesh comes to lie between the tires or wheels and the ground. This measure prevents premature wear of the guide chains as the latter do not come to lie between the vehicle and the ground in the region of the tread.

To prevent the chain mesh from being excessively tensioned in particular while the anti-skid chain is circulating around two wheels disposed at the vehicle one behind the other at fixed distances, the chain mesh may comprise, according to a further advantageous embodiment, ladder sections in the circumferential direction which are only connected to the rest of the chain mesh via the guide chains. Successive ladder sections in the circumferential direction thus form independent traction segments which cannot transmit any forces in the circumferential direction via the chain mesh. The transmission of such forces and the cohesion of the anti-skid chain are accomplished in this embodiment exclusively by the guide chains. Since the guide chains do preferably not rest on the tread they maintain certain mobility in the circumferential direction and may balance tensions and displacements in the chain mesh.

Furthermore, the chain mesh may comprise ladder sections which extend, preferably in the lateral direction, from the one to the other guide chain, in particular continuously. The ladder sections may comprise chain strands or consist of chain strands. The chain strands may be composed of uniformly or differently designed chain links, for example of round steel or sectional steel chain links, or of web-ring combinations.

A particularly simple embodiment of the anti-skid chain may provide for the ladder sections to comprise ladder strands, i.e. chain strands that extend continuously from one guide chain to the other. However, the ladder sections may also be composed of chain strands extending in the lateral direction in an x- or o-shape.

For the anti-skid chain to have high directional stability, the chain mesh may comprise at least one track edge extending in the circumferential direction. The track edges are formed in particular by radially external sections of the chain mesh which press into the ground in operation. Due to their orientation, the track edges prevent a lateral slipping of the tire.

If one ladder section comprises several ladder strands, these may be connected to each other by one track piece or by several track pieces. The track edges may be formed at any elements of the chain mesh, but in particular at the track pieces. The track pieces may be elements, for example chain joints, of the chain mesh extending in the circumferential direction. A ladder section which only has one single chain strand may also comprise track edges or track pieces.

To keep the chain mesh preferably free from forces extending in the circumferential direction, according to a further advantageous embodiment the ladder sections may extend in the circumferential direction over not more than the length of the tire contact patch in the circumferential direction.

The structural cohesion of the anti-skid chain is preferably ensured by the guide chains. The guide chains may in particular keep the chain mesh together.

The guide chains may be embodied as joint chains, in particular as plate link chains and/or as forged fork link chains. The advantage of this embodiment is that plate link chains have a high lateral stability without any particular constructive measures. Moreover, plate link chains are narrow, so that they do not require much space on the tire in the lateral direction. Therefore, they are also well-suited for constricted assembly situations where only little space is present between the side wall of the tire and a wheel house of the vehicle.

The chain mesh and/or the guide chains are preferably made of a metal material. A metal material, in particular steel or iron, is not only wear- and corrosion-resistant but may also be easily repaired on site, for example by welding.

It is moreover advantageous for the guide chains to comprise joint points which are located in the radial direction at least at the level of the outer end of the tire walls. The joint points should be located within the radius of the tire center, otherwise the guide chains will excessively press into the ground. The joint points are preferably located approximately at the level of the tire shoulder or somewhat below it. With this position of the joint points, only small speed differences between the chain mesh and the joint points or the guide chains occur when the chain mesh is running on the tread of the tires, and consequently, only small forces occur in the chain mesh in the circumferential direction.

A further advantageous embodiment provides for at least one guide chain, preferably both guide chains, to be self-supporting in at least one radial direction. This means that the guide chains are only up to a certain deflection limp and consequently cannot collapse, for example under the action of gravity. So, the guide chains may be laterally stable in particular in one direction, in particular in the lateral direction, and thus be nearly rigid in this direction. In the radial direction in which this lateral stability is not present, the guide chains may be self-supporting and thus only be limp to a certain degree. The anti-skid chain may, in particular under the action of gravity, assume a stable inherent shape in the form of at least one arc of a circle in a plane extending perpendicularly to the wheel axles if it supports itself. The guide chains preferably form the supporting frame of the anti-skid chain in which the chain mesh is hung up. The inherent stability or self-supporting property can be easiest realized with a joint chain which is movable only in one dimension.

The guide chains may assume a self-supporting radius under their own weight which is preferably at least as large as the diameter of the outer end of the tire walls, taking into consideration the deformation by compression of the tires at the tire contact patch. Thereby, the anti-skid chain supports itself when it is mounted. The chain mesh does not have to absorb any laterally acting forces to tension the guide chains and prevent them from collapsing. The self-supporting radius is the radius on which the guide chains, in particular their joint points, are located when they support themselves.

According to a further advantageous embodiment, the self-supporting radius may be at most as large as the radius of the tires in the tire center, preferably measured at the outer edges of the guide chains, not taking into consideration the deformation by compression at the tire contact patch. This dimensioning is insofar a possible upper limit for the self-supporting diameter as the guide chains would otherwise be excessively pressed into the ground. Preferably, the self-supporting radius corresponds to the radius of the tire shoulder in a non-loaded state of the tires.

A guide chain which is self-supporting in the radial direction may be constructively easily created by providing supporting elements which adjacent links of the guide chain strike when they are tilted into at least one direction by a maximum joint angle. When the maximum joint angle is reached in such an advantageous embodiment, no further tilting is possible. The links of the guide chain then support each other via the supporting elements. The guide chain is in this embodiment only limp as long as adjacent links are not tilted with respect to each other by more than the maximum joint angle.

The supporting elements may be embodied in the form of laterally or axially protruding shoulders or webs with stop faces radially facing outwards and/or inwards. The supporting elements may be provided only at every second link of the guide chain.

If the guide chains are formed by forged fork link or plate link chains, the supporting element of the one plate link may support an adjacent plate link.

The supporting elements are preferably located at the side of a guide chain facing away from the chain mesh in order not to affect the mobility of the chains. In case of forged fork link chains, the supporting elements may also be located at either side of the guide chain, so that both limbs are supported on one forged fork link.

The supporting elements prevent the collapse of the guide chain and hold it tensioned in the self-supporting diameter. The maximum joint angle of two successive links of the guide chain may be in the radially inward direction between 10° and 20°, in particular about 15°.

The guide chain may furthermore be provided with links which comprise guide elements radially protruding to the outside. The guide elements preferably have guide surfaces whose normals are directed towards the tire center. Every second link of the guide chain may be provided with such a guide element. The guide surfaces serve to align the anti-skid chain at the tires and to retain the tires between the guide chains. The guide surfaces may protrude, for example, from the radially outer end of the tire walls or the tire shoulder in the radial direction to the inside. In operation, the guide surfaces preferably lie against the tire walls and/or the tire shoulder.

The links of the guide chain which comprise the guide surfaces are preferably located at the side of the guide chain facing the chain mesh, while links lying in-between are preferably disposed outside at the side of the guide chain facing away from the chain mesh. By this measure, the guide chain obtains good mobility because the outer chain links may move without sliding with friction at the tire.

In an advantageous further development, the guide surfaces may be formed by plate links elongated in the radial direction if joint chains, in particular plate link chains are used as guide chains.

Joint points where the chain links are guided so as to be rotatable with respect to each other may be, according to a further advantageous embodiment, integrally formed by the chain links. This may be realized in a simple manner by cast chain links. The joint points may be embodied as joint extensions, for example in the form of frustums of a cone.

When forged fork links are employed, the joint points may be added only to every second chain link. The forged fork links may then be produced from two or more partial bodies which are attached to the two joint points formed at either side of the one chain link and only subsequently connected with each other to form a forged fork link. The guide surfaces may be inclined with respect to a plane extending perpendicularly to the wheel axles or parallel to the circumferential direction, where in the lateral direction, directly or diagonally opposite guide surfaces form a wheel intake slant which expands inwards in the radial direction. The inclined extension of the guide surfaces results in a lower load of the side wall of the tire when the anti-skid chain is getting onto the tire.

The guide elements, their guide surfaces and the chain mesh form a tire accommodation channel open to the inside in the radial direction in which the tire is guided at three sides. The tire accommodation channel may become laterally wider in the radial direction, so that the tires more easily get into it.

The chain mesh may be attached, in particular welded, to the guide chains at fixing points.

The fixing points are located, according to one embodiment, radially outside the joint points. To prevent the chain mesh from getting caught in the tread pattern, it is advantageous for the fixing points to be located at least outside a contact patch at least at the level of the tire shoulder or in a radius which at least corresponds to the radius of the tire shoulder in the region of the tire contact patch. However, it is even more advantageous for the fixing points to be located radially at the level of the joint points, so that the joint points and the fixing points, and on the fixing points at least the lateral edge of the chain mesh, circulate at the same circumferential speed.

In particular on a ground that is not very portative, the support surface provided by the tire is sometimes not sufficient for preventing it from sinking in. Equally, in case of loose ground, it is important to prevent the vehicles from excessively compacting the soil. Both problems may be solved if the anti-skid chain provides an additional contact patch. Consequently, a further development of the invention provides for the guide chains to be provided with a plate-like contact patch extending in parallel to the circumferential direction.

The contact patch preferably extends from the chain mesh away in the lateral direction to the outside. The contact patches of the links of the guide chains increase the overall contact patch of the vehicle, so that the pressure onto the ground exerted by the vehicle is reduced. This leads to a reduced soil compaction and to a reduced sinking-in of the anti-skid chain. The contact patches may be formed at the chain links where the guide elements are also located. The plates forming the guide elements may thus be easily extended at the contact patches.

The contact patch may be easily formed by angled plate links, for example when a joint chain or a plate link chain is used. Angled plate links have an angular cross-section, seen in the circumferential direction.

The contact patches of the guide chain are, according to an advantageous embodiment, located in the radial direction at least at the level of the tire shoulders. Furthermore, the contact patches may be located in the radial direction at most at the level of the radius of the tire center. If the contact patches are located approximately at the level of the radially outer end of the tire walls, the contact patches only support themselves on the ground when the tires have already somewhat sunken in. When the ground is hard, the contact patch remains unused and is less subjected to wear. The more the contact patches are moved radially to the outside, the more often they come into contact with the ground. To prevent the contact patches from always coming into contact with the ground, they should not be located beyond the tire center in the radial direction.

The contact patches are located in the radial direction, preferably beyond the joint points. They simultaneously serve as a protection of the joint points.

The joint points may contain screws or studs, in particular with standardized heads as fastening means and/or as axles, so that no special tools are required for dismounting the guide chains.

Good guidance of the tires in the anti-skid device is achieved if the chain mesh limits the distance between the guide chains to at least the width of the tire in the region of the tire contact patch.

The chain mesh is preferably fixed to those links of the guide chain where the guide surfaces are located. The guide elements may thus be also used for fixing the chain mesh.

The anti-skid chain of one of the above embodiments is in particular suited for two wheels disposed at variable distances as they are present, for example, in tandem axles. In this arrangement, particular care should be taken that the joint points or the guide chain and the chain mesh circulate at the same circumferential speed.

The invention finally relates to a vehicle with two wheels with tires which are disposed one behind the other at fixed distances, in particular tires of a tandem axle, with an anti-skid chain in one of the above-described embodiments.

The invention will be illustrated more in detail below by way of example by different embodiments with reference to the drawings. According to the above embodiments, the individual features of the different embodiments may be arbitrarily combined with each other if in certain applications, an advantage linked to a feature is not relevant.

In the enclosed figures, for the sake of simplicity the same reference numerals are always used for elements that are equal with respect to their shapes and/or functions.

FIG. 1 shows an anti-skid chain 1 in a plan view onto schematically shown tires 2 and a ground 3.

The tires 2 are mounted on wheels (not shown in FIG. 1) which are attached to a vehicle (not shown) at fixed distances. This means the distance of the wheel axles from each other always remains constant independent of the excursion of the wheels. This is the case, for example, with tandem axles which are employed in vehicles in forestry and agriculture.

The anti-skid chain 1 comprises two lateral guide chains 4 which are preferably identical. The guide chains essentially extend in parallel with respect to each other in the circumferential direction 5, forming two closed chain slings lying, in the lateral direction 6, one next to the other. The circumferential direction 5 follows the course of the guide chains and is identical with their longitudinal direction.

The guide chains 4 are in particular joint chains. As is represented in FIG. 1, the guide chains 4 may be formed in particular by a plate link chain with plate links 7, 8 which are connected to each other at joint points 9. The tire wall forms the profiled part of the side walls of the tire. At a tire shoulder 11, a tread 12 of the tire 2 passes over into the side wall. The tread 12 of the tire often has very large cleats in forestry and agricultural vehicles. Therefore, the tread pattern often extends radially between the outer end of the tire wall 10 and the tire shoulder 12 to the non-profiled side wall of the tire. The guide chains 4 are located, as shown in FIG. 1, laterally of the tread 12, preferably radially at the level of the tire walls 10.

The guide chains 4 or the joint points 9 are located in the radial direction of each of the tire wall 11 approximately at or somewhat underneath the level of the tire shoulder 11, at least, however, within the radius of the tire center 13 which is often larger than the radius of the tire shoulder. The guide chains 4 preferably lie laterally loosely at the tire.

Between the two guide chains 4, a limp chain mesh 14 extends in the lateral direction 6 which comes to lie between the tread 12 and the ground 3 in operation. Preferably, only the chain mesh 14 is located between the tire 2 and the ground 3 to keep wear of the guide chains 4 as low as possible.

The chain mesh 14 comprises chain strands 15 or consists of such chain strands and is preferably divided into ladder sections 16 in the circumferential direction 5. The ladder sections 16 are independent of each other in the circumferential direction 5 because they are only connected to each other via the guide chains 4. In this manner, the chain mesh 14 may only transmit a force acting in the circumferential direction 5 within one ladder section 16. The force acting in the circumferential direction 5 is not transmitted to the adjacent ladder sections 16 via the chain mesh 14, so that the chain mesh may more easily adapt in operation and run onto the tires 2 without tensioning.

The ladder sections 16 preferably extend continuously from the one guide chain 4 to the opposite, other guide chain 4. They may be formed from one or several ladder strands 17, in the simplest case from one single ladder strand 17. Ladder strand here means a chain strand which extends transversely to the circumferential direction, preferably continuously from the one to the other guide chain 4, which, however, does not have to be composed of equal chain links 18.

Only by way of example, FIG. 1 shows a ladder section of two parallel ladder strands 17 which are connected to an x-shaped configuration. Other, for example o-shaped configurations are also possible.

The ladder sections 16 may comprise at least one track piece 19 which extends in the circumferential direction, or it may comprise at least one track edge 20 extending in the circumferential direction 5 and coming into engagement with the ground 3. The track pieces 19 may be formed by chain links extending in the circumferential direction and standing on the tread 12 of the tire. The track edges 20 may be embodied at any chain links 18, in particular the track pieces. The track pieces 19 or track edges 20 increase the directional stability of the anti-skid chain 1.

In the special embodiment of FIG. 1, two track edges 20 are provided on either side of the tire center 13. The track pieces 19 are hung into at least one ring link 21 forming an essentially rectangular sub-section 22 of the chain mesh.

The guide chains 4 furthermore comprise holding elements 23 to which the chain mesh 14 is fixed. The holding elements 23 may have a plate-like design and protrude from the joint points 9 to the outside in the radial direction.

Figure 2:
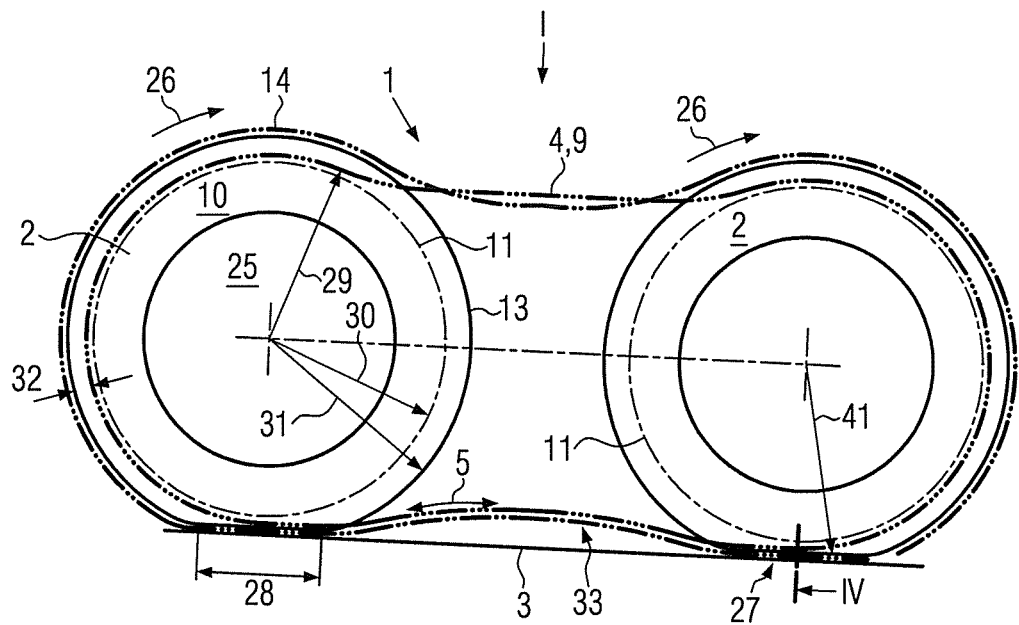
FIG. 2 shows a schematic side view in the viewing direction of arrow II in FIG. 1.

FIG. 2 shows the view II of FIG. 1. Arrow I in FIG. 2 shows the viewing direction of FIG. 1.

The anti-skid chain 1 is in FIG. 2 only represented in dot-dash lines, where the double dot-dash line indicates the position of the chain mesh 14 in the region of the tire center, and the triple dot-dash line indicates the course of the guide chains 4, in particular the joint points 9 of the guide chains 4. The wheels 25 with the tires 2 rotate in a sense of rotation 26.

The position of the tire shoulders 11 is designated by a broken line, the radially outer end of the tire walls by a simple dot-dash line. In the region of the tire contact patch 27, the tire is deformed by compression, resulting in a flattening which extends in the circumferential direction 5 over a length 28. The ladder sections 16 preferably extend in the circumferential direction 5 at most over the length 28 of the tire contact patch 27, so that forces triggered when the tire contact patch is being passed act in the chain mesh in the circumferential direction only over a limited section.

As can be further seen in FIG. 2, the guide chains 4 or their joint points 9 are located on a radial position 29 which is lying at least outside the tire contact patch 27 outside a radial position 29' of the outer ends of the tire walls in the region of the radial position 30 of the tire shoulder 11, and within approximately the radial position 31 of the tire center 13. The fixing points 24 are located in a radial region 32 which extends from the radial position 29 of the joint points to the radial position 31 of the tire center. The fixing points 23 are preferably lying on a larger diameter than the joint points 9, at least at the level 20 of the tire shoulder 11.

At fixing points 24, the chain mesh 14 is connected, for example welded, with the guide chains 4. The fixing points 24 at which the chain mesh 14 is fixed to the guide chains 4 are located at least outside the tire contact patch 27, each preferably in the radial direction of the respective tire shoulder. The fixing points 24 should not be located outside the radius of the tire center 13. In the lateral direction 6, the holding elements 23 or the fixing points 24 may be spaced apart from the tire 2 at least outside the region of the tire contact patch. This prevents increased wear of the tires and the guide chains and permits sufficient space for the deformation by compression and the bulging of the tire in the region of the tire contact patch at which the tire 2 rests on the ground 3.

The relative position of the guide chains 4 and the tire shoulder 11 changes when the tire is loaded due to the deformation by compression at the tire contact patch, in particular if the guide chains 4 rest on the ground 3. In operation, the mid-point of the reference circle formed by the guide chains 4 is offset to the top with respect to the tire mid-point, for the ground presses the guide chains upwards. When the wheels move, the mid-points of the guide chains are offset against the moving direction of the vehicle and at the rear with respect to the mid-points. Due to the different mid-points of the guide chains and the tires, here only the radial positions, not the radii, are compared to each other.

The chain mesh 14 is preferably not tensioned in the lateral direction 6 and sags at the upper side in the region 33 between the tires 2. At the ground 3, it is often pressed somewhat upwards between the tires, as FIG. 2 shows schematically. Due to the higher mobility of the chain mesh 14 with respect to the guide chains, the trajectories of the guide chain 4 and the chain mesh 14 differ from each other when they circulate around the two tires 2 and the region 33 in-between. The differing trajectories follow different radial positions, so that the guide chains 4 and the chain mesh 14 and different parts of the chain mesh have different circumferential speeds. The radial positions of the joint points 9 and the fixing points 24 should be situated as close to each other as possible, so that the differences in the circumferential speeds are as low as possible and do not lead to an excessive load of the chain mesh.

Figure 3:
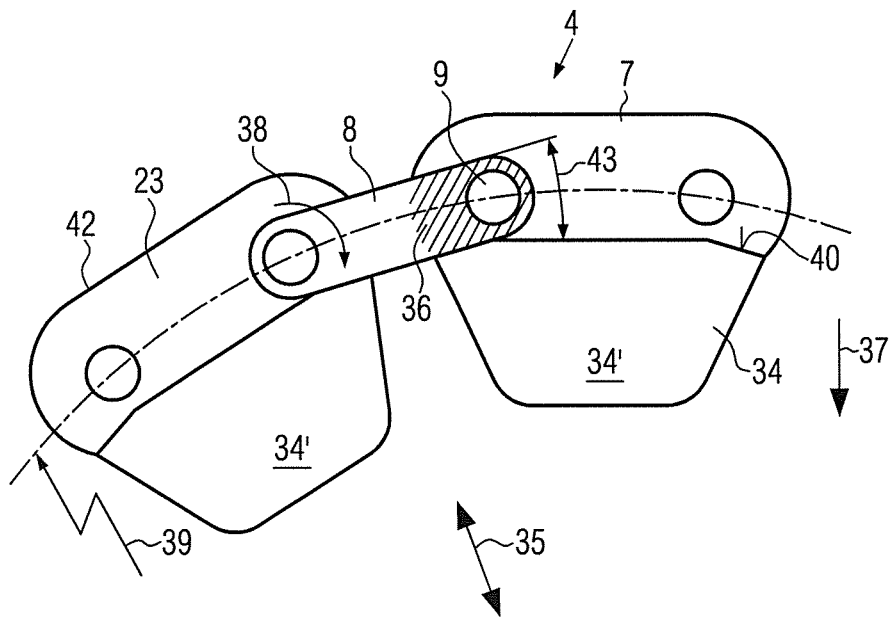
FIG. 3 shows a schematic side view of a detail of the anti-skid chain in the viewing direction of arrow II in FIG. 1.

FIG. 3 shows a detail of a guide chain 4 along the view II of FIG. 1. Only by way of example, the guide chain 4 is represented as plate link chain. The term "plate links" will be used below in place of chain link. So, instead of the plate links 7, 8 represented in FIG. 3, chain links of a different shape may also be used, the plate links 8 may be formed, for example, by forged fork links.

As shows FIG. 3, individual plate links 7, preferably every second plate link, are provided with guide elements 34 which may extend to the inside in the radial direction 35 and in particular have a plate-like design. The guide elements 34 preferably lie with guide surfaces 34' against the tire walls 10 (cf. FIGS. 1, 2). The guide elements 34 of the two guide chains 4 may lie each directly or diagonally opposite each other in the lateral direction 6. They assist the tire in automatically centering between the guide chains 4 when the anti-skid chain 1 is getting on. To facilitate the getting on and centering of the tire, the guide surfaces 34' may be inclined with respect to the radial direction 35, the distance between opposite guide surfaces 34' increasing radially to the inside.

FIG. 3 furthermore shows that the guide chain 4 is laterally stable and self-supporting. By the lateral stability, the guide chain 4 is not limp in the lateral direction 6 but the links of the guide chain are movable at most by a small amount relative with respect to each other before they strike each other. In a plate link chain, lateral stability is achieved, for example, by the plate links 7, 8 overlapping in the lateral direction 6 in a region 36 which is shown in section lines in FIG. 3. In the lateral direction 6, some clearance may be present in the joint points 9, so that the guide chain 4 somewhat yields in this direction. If the plate links 7, 8 strike each other in the overlap region 36, the guide chain 4 will block. The lateral stability of the guide chains 4 leads to a dimensional stability of the complete anti-skid chain 1.

The guide chain 4 is furthermore self-supporting in at least one radial direction 35. This means that it is neither completely limp in a plane perpendicular to the circumferential direction, and in particular does not collapse in at least one swivel direction 38 of the plate links 7, 8 under the action of gravity 37 but assumes a self-supporting radius 39. The self-supporting radius 39 is determined by the radial position of the joint points.

The self-supporting property of the guide chain is achieved in that in the one swivel direction 38, a supporting element 40, for example in the form of a stop collar, is present and limits the relative mobility of the plate links 7, 8 about the joint points 9 with respect to each other. The supporting element 40 may be formed by a step protruding in the lateral direction, for example a shoulder radially facing outwards or inwards, or a corresponding web.

The self-supporting radius 39 is preferably at least as large as an outer radius 41 (FIG. 2) of the tire wall at the tire contact patch 28. This radius is smaller than the radius of a non-loaded tire. So, the self-supporting radius 39 is preferably dimensioned such that, in the operation of the anti-skid chain 1, the guide chains 4 support themselves and also the chain mesh 14 in the region of the tire 2. However, to prevent edges 42 of the guide chains 4 lying radially outside from being pressed into the ground 3, the radial outer edges 42 preferably extend in a radius which is smaller than the radius 31 (FIG. 2) of the tire center, preferably smaller than the radius 41' of the tire contact patch. The radius on which the fixing points 24 lie in the self-supporting state of the guide points corresponds at least to the radius 41' of the tire shoulder 12 and at most to the radius of the tire center.

The linking line between successive joint points is, in the self-supporting radius, each offset by a maximum joint angle 43. The angle 43 is between 10° and 20°.

The supporting element 40 and the plate links 8 between the plate links 7 and the guide elements are preferably located at the side of the guide chain facing away from the chain mesh 14.

The self-supporting radius 39 prevents the guide chains 4 from lying on too small a radius with respect to the tread of the tires, and it prevents an excessive speed difference from occurring between the guide chains 4 and the chain mesh.

In the plate link shown in FIG. 3, the holding element 23 at which the chain mesh 14 is fixed at the guide chains is embodied by the holding elements 23 of the plate links 7, 8 protruding in the radial direction to the outside.

Figure 4:
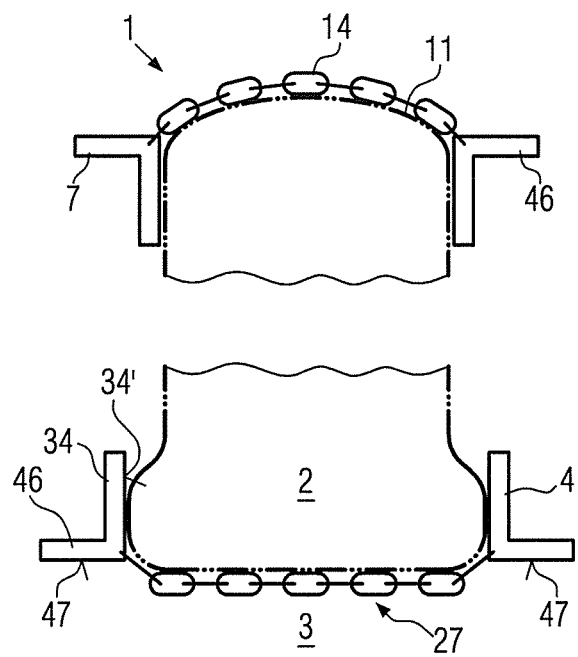
FIG. 4 shows a further embodiment of the anti-skid chain according to the invention in a schematic sectional view in the direction of arrow IV in FIG. 2.

FIG. 4 shows a schematic sectional view through the tire 2 along arrow IV of FIG. 2 in the region of the tire contact patch 27.

As can be seen, the tire laterally arches to the outside at the tire contact patch 27, so that it is broadened at this point. The minimum distance 44 of the guide chains which is determined by the width of the chain mesh 14 in the lateral direction 6 is dimensioned such that the tire 2 can also be received at the tire contact patch 27 between the guide chains 4, in particular their guide surfaces 34'. The width of an accommodation channel formed by the anti-skid chain 1 which is defined in the lateral direction 6 by the guide chains 4, in the radial direction outside by the chain mesh 14, corresponds at least to the width in the lateral direction 6 of the tire 2 at the tire contact patch 27.

In FIG. 4, one can furthermore see that the tire accommodation channel 45 expands to the inside in the radial direction 35, so that the tire 2 more easily centers itself automatically when the anti-skid chain 1 is getting on. This may be achieved by the guide elements 34 (FIG. 3) having an inclined extension with respect to the axles of the joint points 9.

Figure 5:
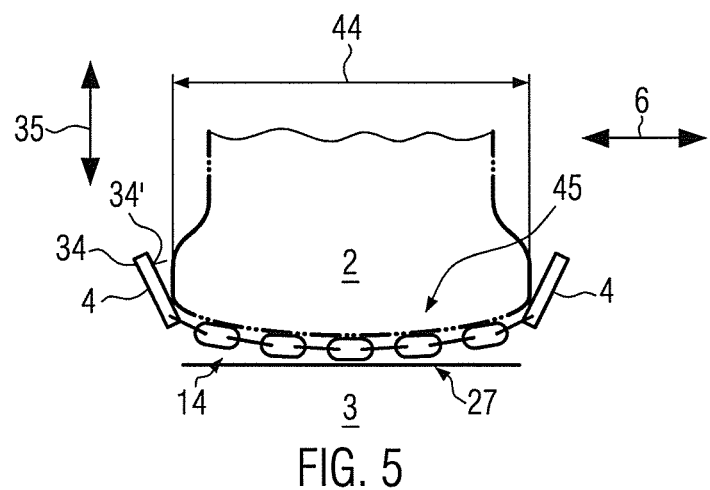
FIG. 5 shows a further embodiment of the anti-skid chain according to the invention in a schematic sectional view in the direction of arrow IV in FIG. 2.

FIG. 5 shows a further embodiment of an anti-skid chain 1. In this embodiment, the contact patch is enlarged by the anti-skid chain 1. For this, the anti-skid chain 1 embodies contact elements 46 which extend in the lateral direction 6, preferably in parallel to the circumferential direction 5 away from the tire 2. This can be achieved, for example, by angular plate links 7. The contact elements form contact patches 47 which point radially to the outside. With a soft ground, for example, when the tire 2 sinks into the ground 3, the contact elements 46 rest on the ground 3 and thus enlarge the complete contact patch of the tire contact patch 27 and the anti-skid chain 1.

The contact elements 46 may in particular have a plate-like design and a radial position as described above in connection with the radial outer edges 42 at FIG. 3. They are lying at a radial position which may extend from the position of the tire shoulder at the tire contact patch, i.e. at the level of the radius 41, to the radial position 31 of the tire center 14. The further outside the contact patches 47 are located, the more easily they come into contact with the ground.

Figure 6:
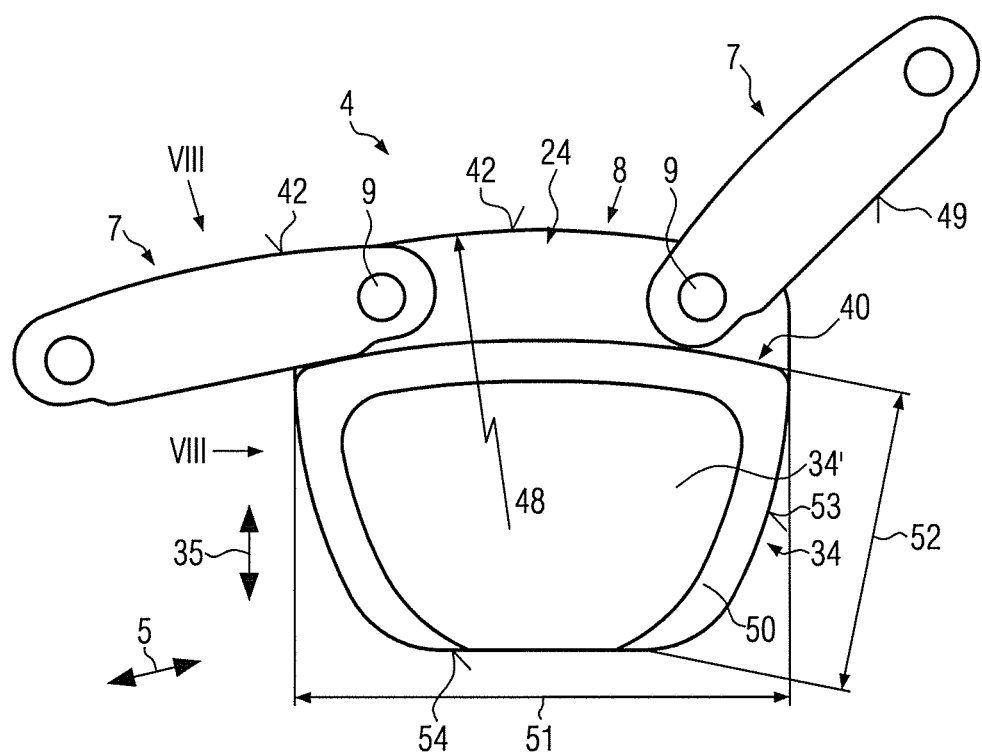
FIG. 6 shows a schematic side view of a further embodiment of a guide chain for the anti-skid chain according to the invention.

FIG. 6 shows a schematic side view of a further embodiment of a guide chain 4. In this embodiment, the fixing points 24 are located between the joint points 9. By this, the chain mesh (not shown) is held at the same radial level as the joint points 9. This leads to particularly small differences in the circumferential speeds of the chain mesh and the guide chain 4.

The radial outer edges 42 are in this embodiment preferably concavely bent. A radius of curvature 48 of the radial outer edges 42 may correspond to the radius 30 of the tire shoulder 11.

The supporting element 40 may also be embodied as laterally protruding shoulder as in the embodiment described above. The contour of the supporting element preferably follows the contour of a radial inner edge 49 of those chain links 7 which support themselves at the supporting elements 40. If, as in the embodiment of FIG. 6, the radial inner edges 49 are slightly bent, preferably in parallel to the outer edges 42, the supporting element 40 may also have a bend in the circumferential direction. If the guide chain assumes the self-supporting radius, the inner edges 49 snuggle against the shoulder 40 and lie on the shoulders 40 allover.

For stiffening the guide surface 34', the guide element 34 may have one or several ribs 50 which preferably extend in the radial direction to the inside.

A good seat of the anti-skid chain may be achieved if a width 51 of the guide element 34 in the circumferential direction 5 is larger than its height 52 in the radial direction 35. The radial width 51 is preferably larger than the distance of the cleats of the respective tire, so that the guide elements 34 cannot get caught between the cleats when the tread pattern of the tires extends to the side wall of the tire.

To permit a gradual contact of the guide element 34 with the tire when the anti-skid chain is circulating, the width 51 of the guide element 34 decreases as the distance from the joint points 9 increases. The edges 53 lying in the circumferential direction 5 are, in the circumferential direction 5, increasingly bent in particular in the radial direction and extend in a radius to a radially internal edge 54. The radial internal edge 54 may also be bent.

In the guide chain 4 in the embodiment according to FIG. 6, chain links 7 in the form of plate links without guide elements 34 alternate with chain links 8 that are also in the form of plate links which are provided with guide elements 34.

Figure 7:
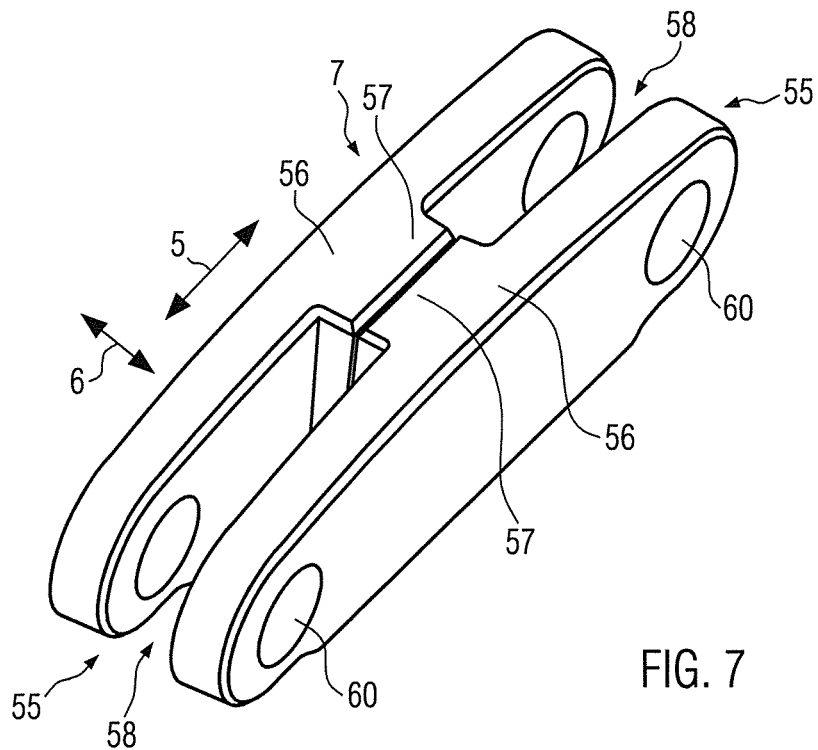
FIG. 7 shows a chain link 7 in a schematic perspective view along a viewing direction VII of FIG. 6.

FIG. 7 shows a chain link 7 in a schematic perspective view along a viewing direction VII of FIG. 6.

The chain links 7 are embodied as forged fork links where both their ends 55 in the circumferential direction 5 are embodied like a fork. As shows FIG. 7, the chain links 7 may be composed of two identical or mirror-inverted plate link bodies 56 which are placed against each other. The plate link bodies 56 may be, for example, welded to each other. Of course, the chain link 7 may also be embodied as casting in one piece. In case of a two-piece design, the plate link bodies 56 comprise central, base-like spacer elements 57 whose front faces may be used as fixing surfaces.

A plate link retainer 58 which is open on one side in the circumferential direction 5 is located at each end 55, serving as receipt for the chain link 8 and being laterally defined by the legs of the forged fork link.

Figure 8:
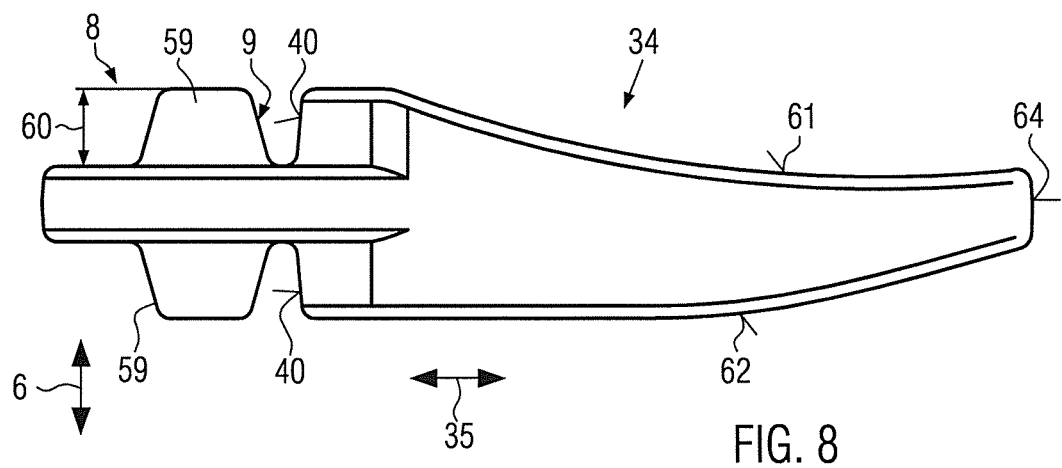
FIG. 8 shows the chain link in a side view along the viewing direction VIII in FIG. 6.

FIG. 8 shows the chain link in a side view along the viewing direction VIII in FIG. 6.

As can be seen, the joint points 9 are preferably integrally formed as joint extensions 59 in the form of a neck of an axle which protrude in the lateral direction 6. The joint extensions preferably have a circular cross-section in planes that are perpendicular to the lateral direction 6 and may in particular have a truncated shape. The diameter of the joint extensions 59 is reduced in the lateral direction 6 as height increases. A height 60 in the lateral direction 6 of the joint extensions 59 is dimensioned such that they do not protrude over the height of the shoulders 40 in the lateral direction 6.

The material thickness of the guide element 34 may decrease in the radial direction 35 as the distance from the joint points 9 increases.

As shows FIG. 8, the joint points 9 are each arranged in pairs at the two opposite sides of one chain link 8 in the lateral direction 6, so that they come into engagement with the respective fork ends of the chain links 7 according to FIG. 7.

Joint openings 60 of the chain links 7 (cf. FIG. 7) may have an inner contour which is complementary to the outer contour of the joint points 9 or joint extensions 59. In case of the embodiment of FIGS. 6 to 8, this means that the inner contours of the joint openings 60 are designed to be complementary to the truncated shape of the joint points 9 in the form of an envelope of a cone and taper to the outside in the lateral direction 6.

In the embodiment of FIGS. 6 to 8, the plate link bodies 56 are, during the assembly of the guide chain 4, first placed separately against the two sides of a chain link 6, and the joint extensions 59 are inserted into the joint openings 60. When this is accomplished at both ends 55 of the chain link 7, the two plate link bodies 56 are subsequently connected to each other, for example welded, glued or screwed. Thus, the chain links 7, 8 are joined.

Of course, one can also do without the joint extension 59 and use a separate stud instead. Such a stud may be captively held in the guide chain 4 by screws or by plastic deformation, for example by upsetting heads.

By the use of fork-like chain links 7, supporting elements 40 are also provided at both sides, as shown in FIG. 8, so that the two fork-like ends of one chain link 7 each may be supported. This increases the load rating of the guide chain 7 in the self-supporting state.

The chain link 8 and the guide element 34 do not have to be symmetrical. An inner side 61 located internally in the lateral direction 6 and facing the chain mesh 14 (not shown) may be concavely bent to better follow the outer contour of a side wall of the tire. An outer side 62 of the guide element 34 at the side of the chain link 8 facing away from the chain mesh may be convexly bent towards the inner side 61. Such a bend towards the tire reduces the risk of the guide chain 4 or its guide elements 34 protruding too far from the tire in the lateral direction 6, which could increase the risk of injuries and damages. The convex or concave bend is preferably more distinct in the direction of the radial inner edge 54.

Although the anti-skid chain 1 is exclusively described in connection with a pair of wheels in the embodiments, it may also be only mounted to one tire. The abovementioned dimensioning rules also apply in this variant.

REFERENCE NUMERALS

1 Anti-skid chain
2 Tire
3 Ground
4 Guide chains
5 Circumferential direction
6 Lateral direction
7 Plate link of the guide chain
8 Plate link of the guide chain
9 Joint point of the guide chain
10 Tire wall
11 Tire shoulder
12 Tread of the tire
13 Tire center
14 Chain mesh
15 Chain strands of the chain mesh
16 Ladder sections of the chain mesh
17 Ladder sections of the chain mesh
18 Chain link
19 Track pieces of the chain mesh
20 Track edges of the chain mesh
21 Ring member
22 Rectangular sub-section
23 Holding elements
24 Fixing points
25 Wheels
26 Sense of rotation
27 Tire contact patch
28 Length of the tire contact patch
29 Radial position of the guide chain or joint points
29' Radial position of the outer end of the tire wall
30 Radial position of the tire shoulder
31 Radial position of the tire center
32 Radial region for the position of the fixing points
33 Region between the tires
34 Guide elements
34' Guide surfaces
35 Radial direction
36 Overlap region
37 Plane spanned by the guide chain
38 Swivel direction
39 Self-supporting radius
40 Supporting element
41 Radius of the tire shoulder at the tire contact patch
41' Radius of the tire contact patch
42 Radial outer edges
43 Angle
44 Distance between guide chains
45 Tire accommodation channel
46 Contact elements
47 Contact patches
48 Radius of curvature
49 Radial inner edge
50 Stiffening ribs
51 Width in the circumferential direction of the guide element
52 Height in the radial direction of the guide element
53 Edge lying in the circumferential direction
54 Radial inner edge
55 Ends
56 Plate link bodies
57 Spacer element
58 Plate link retainer
59 Joint extension
60 Joint openings
61 Inner side of the guide element
62 Outer side of the guide element

The invention claimed is:

1. An anti-skid chain for attachment to at least one wheel having a tire, wherein the anti-skid chain comprises
   two lateral guide chains, which are each self-supportingly laterally stable and which, in the mounted state, are arranged laterally of the treads of the tires; and
   a limp chain mesh which extends between the two lateral guide chains.

2. The anti-skid chain according to claim 1, wherein the chain mesh comprises ladder sections which are connected with the rest of the chain mesh exclusively via the two lateral guide chains.

3. The anti-skid chain according to claim 1, wherein the chain mesh comprises ladder sections which extend continuously from the one to the other guide chain.

4. The anti-skid chain according to claim 1 wherein the chain mesh comprises ladder sections having two strands connected to one another with track edges, the track edges extending in the circumferential direction.

5. The anti-skid chain according to claim 1 wherein the chain mesh is held together by the two lateral guide chains.

6. The anti-skid chain according to claim 1, wherein the ladder sections extend in the circumferential direction over not more than the length of the tire contact patch in the circumferential direction.

7. The anti-skid chain according to claim 1, wherein the two lateral guide chains are plate link chains.

8. The anti-skid chain according to claim 1, wherein the two lateral guide chains comprise joint points which, in the mounted state, lie at least at the level of the radially outer end of the tire wall.

9. The anti-skid chain according to claim 8, wherein at least one guide chain is radially self-supporting.

10. The anti-skid chain according to claim 9, wherein the two lateral guide chains extend under their own weight at least in sections like the arc of a circle in a self-supporting radius.

11. The anti-skid chain according to claim 10, wherein the self-supporting radius is at least as large as the outer radius of the tire wall, taking into consideration the deformation by compression at the tire contact patch.

12. The anti-skid chain according to claim 10, wherein the self-supporting radius is at most as large as the radius of the tire center without taking into consideration the deformation by compression at the tire contact patch.

13. The anti-skid chain according to claim 10, wherein the two lateral guide chains comprise supporting elements against which adjacent links of the two lateral guide chains strike when tilted about a maximum joint angle.

14. The anti-skid chain of claim 10, wherein each lateral guide chain includes guide links separated by connecting links, wherein lateral forces cause the interference between the guide links and the connecting links, thereby providing lateral stability.

15. The anti-skid chain according to claim 1, wherein the chain mesh restricts the distance between the two lateral guide chains to at least the width of the tire in the region of the tire contact patch.

16. The anti-skid chain according to claim 1, wherein the chain mesh is attached to fixing points at the two lateral guide chains and that the fixing points are located in the mounted state at least outside a tire contact patch at least at the level of the tire shoulder.

17. The anti-skid chain of claim 1, wherein the anti-skid chain is attached to two wheels with tires arranged at fixed distances.

18. Vehicle with two wheels with tires arranged one behind the other, characterized by the anti-skid chain according to claim 17.

19. The anti-skid chain of claim 1, wherein the lateral stability is provided by adjacent links interference with each other in the lateral direction.

20. The anti-skid chain of claim 19, wherein each guide link includes a step protruding in the lateral direction forming a shoulder and each shoulder faces away from the chain mesh, wherein the shoulder forms a support surface allowing the guide link to interfere with the rotation of the connecting link thereby providing radial stability to the lateral guide chains.

* * * * *